(12) United States Patent
Kühnle

(10) Patent No.: US 10,557,538 B2
(45) Date of Patent: Feb. 11, 2020

(54) TORQUE CONVERTER

(71) Applicant: Schaeffler Technologies AG & Co. KG, Herzogenaurach (DE)

(72) Inventor: Michael Kühnle, Bühl (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 170 days.

(21) Appl. No.: 15/579,513

(22) PCT Filed: May 25, 2016

(86) PCT No.: PCT/DE2016/200249
§ 371 (c)(1),
(2) Date: Dec. 4, 2017

(87) PCT Pub. No.: WO2016/192725
PCT Pub. Date: Dec. 8, 2016

(65) Prior Publication Data
US 2018/0149251 A1    May 31, 2018

(30) Foreign Application Priority Data
Jun. 5, 2015   (DE) ........................ 10 2015 210 363

(51) Int. Cl.
F16H 45/02    (2006.01)

(52) U.S. Cl.
CPC ..... *F16H 45/02* (2013.01); *F16H 2045/0205* (2013.01); *F16H 2045/0247* (2013.01); *F16H 2045/0278* (2013.01)

(58) Field of Classification Search
CPC ............. F16H 45/02; F16H 2045/0278; F16H 2045/0205; F16H 2045/0247
See application file for complete search history.

(56) References Cited

U.S. PATENT DOCUMENTS 5,812,505 A * 9/1998 Shimoda .............. G11B 7/0901
369/44.29
9,752,667 B2 * 9/2017 Depraete ................. F16H 45/02
(Continued)

FOREIGN PATENT DOCUMENTS

| CN | 1274655 A | 11/2000 |
|---|---|---|
| CN | 1662752 A | 8/2005 |

(Continued)

OTHER PUBLICATIONS

International Search Report for PCT/DE2016/200249; 2 pgs; dated Sep. 26, 2016 by European Patent Office.

*Primary Examiner* — David J Hlavka
(74) *Attorney, Agent, or Firm* — Lekeisha M. Suggs

(57) ABSTRACT

A hydrodynamic torque converter comprising a pump wheel and a turbine wheel mounted to be rotatable about an axis of rotation is disclosed. A fluid in a region between the pump wheel and the turbine wheel is provided wherein a first axial contact surface is formed on the pump wheel and a second axial contact surface is formed on the turbine wheel. A frictional connection between the pump wheel and the turbine wheel can be produced when the pump wheel and the turbine wheel are pressed axially against one another. Moreover, one of the contact surfaces is configured to be flexible in order to lie against the other contact surface under an axial pressure load.

11 Claims, 7 Drawing Sheets

(56) References Cited

U.S. PATENT DOCUMENTS

| | | | |
|---|---|---|---|
| 10,267,398 B2 * | 4/2019 | Ramsey | F16H 45/02 |
| 2006/0086584 A1 * | 4/2006 | Maucher | F16D 47/06 |
| | | | 192/3.29 |
| 2014/0097055 A1 * | 4/2014 | Lindemann | F16H 41/24 |
| | | | 192/3.21 |
| 2015/0027110 A1 | 1/2015 | Lindemann | |
| 2015/0152951 A1 * | 6/2015 | Rentfrow | F16H 45/02 |
| | | | 192/3.29 |
| 2018/0291992 A1 * | 10/2018 | Saleh | F16H 41/28 |

FOREIGN PATENT DOCUMENTS

| | | |
|---|---|---|
| CN | 102066796 A | 5/2011 |
| DE | 102014224114 A1 | 6/2015 |

* cited by examiner

TORQUE CONVERTER

CROSS-REFERENCE TO RELATED APPLICATIONS

This application is the U.S. National Phase of PCT Appln. No. PCT/DE2016/200249 filed May 25, 2016, which claims priority to DE 10 2015 210 363.3 filed Jun. 5, 2015, the entire disclosures of which are incorporated by reference herein.

TECHNICAL FIELD

The present disclosure relates to a torque converter. In particular, the disclosure relates to a hydrodynamic torque converter in a device for transmitting torque.

A device for transmitting torque is provided in a drive train, for example on board a motor vehicle. The device is located between a drive motor and a gear and comprises a hydrodynamic torque converter. The torque converter is formed by a pump wheel and a turbine wheel, which are mounted to be rotatable about a common axis of rotation. A fluid, typically an oil, which couples the two wheels fluid-dynamically to one another, is stored between the two wheels of the torque converter. The greater the difference in speed between the two wheels, the greater the torque transmitted between them. A starting or stopping procedure of the above-mentioned vehicle can be assisted, for example, by means of the torque converter.

To reduce a slip between the pump wheel and the turbine wheel, a lock-up clutch is provided, which is designed as a friction clutch. To this end, the pump wheel and the turbine wheel each have an axial contact surface which are axially opposite one another. If the two wheels are pressed axially against one another, the contact surfaces engage in one another and produce a frictional connection.

BACKGROUND

For quiet, low-loss and comfortable operation of the torque converter, it is necessary to match the two contact surfaces precisely to one another. An axial offset, an unbalance or a wobbling movement of one of the contact surfaces with respect to the axis of rotation can jeopardize the bearing behavior, the regulating behavior or the fatigue strength of the torque converter, for example.

An object of the present disclosure is to provide an improved hydrodynamic torque converter.

SUMMARY

A hydrodynamic torque converter comprises a pump wheel and a turbine wheel, which are mounted to be rotatable about a common axis of rotation, and a fluid in a region between the pump wheel and the turbine wheel. A first axial contact surface is formed on the pump wheel here and a second axial contact surface is formed on the turbine wheel, so that a frictional connection between the pump wheel and the turbine wheel can be produced when the pump wheel and the turbine wheel are pressed axially against one another. One of the contact surfaces is designed to be flexible in order to lie closely against the other contact surface under an axial pressure load.

The contact surfaces form a lock-up clutch for the torque converter. The torque converter having the lock-up clutch is sometimes also referred to as an integrated torque converter (iTC). In particular, the closing and opening of the lock-up clutch can take place in a smoother, more gentle or more controllable manner as a result of the flexibly designed contact surface. The flexibly designed contact surface can have a positive influence on the bearing behavior, the regulating behavior, an axial offset or a wobbling movement.

The turbine wheel is preferably connected on the radially outer side to a housing in which the turbine wheel is received. The housing encloses the fluid in the region of the pump wheel. The contact surfaces are typically arranged on a radial outer side of hydrodynamic guide elements on the pump wheel or on the turbine wheel.

In one embodiment, the flexible contact surface comprises a metal sheet which is folded over circumferentially. The fold extends preferably about the axis of rotation and the unloaded metal sheet typically forms a V shape in longitudinal section. The metal sheet can be easily integrated with further elements of the pump wheel or the turbine wheel. The flexibility of the contact surface is easily created as a result of the circumferential fold.

In one embodiment, the fold angle is less than 180° so that the unloaded fold is open. The portion of the metal sheet which forms one of the contact surfaces can thus be elastically deformed in an improved manner when the pump wheel and the turbine wheel are pressed axially against one another.

In one embodiment, the metal sheet is thinned out in the region of a bending edge of the fold. It is thus possible to maintain the strength of the contact surface whilst at the same time increasing the bendability or flexibility of the contact surface. The spring effect of the metal sheet can likewise be increased by extending the effective bending length.

In one embodiment, the metal sheet is folded over a plurality of times in alternate directions. In longitudinal section, the metal sheet here can assume an S or Z shape which has a plurality of circumferential bending edges or folds which can each contribute to the flexibility when mounting the contact surface on the respective wheel.

In one embodiment, the flexible contact surface comprises a separate element which is connected to the pump wheel or the turbine wheel. It can thus be easier to configure the pump wheel or turbine wheel according to its hydrodynamic function, whilst the separate element is more easily able to promote the flexible mounting of the contact surface.

In one embodiment, the separating element is connected in a fluid-tight manner to the pump wheel or the turbine wheel. In particular, it is thus possible to better assist an embodiment of the torque converter in which one of the wheels at the same time constitutes a hydraulic piston which effects the axial contact-pressure force between the pump wheel and the turbine wheel.

The mutually contacting contact surfaces can enclose a predetermined angle with the axis of rotation. This angle can be in particular 90° so that the contact surfaces are located in the rotational plane when they are pressed axially against one another. However, the contact surfaces can also enclose another angle with the axis of rotation in the state in which they are pressed against one another.

In a further embodiment, the mutually contacting contact surfaces are spherically bent with respect to the axis of rotation. One of the contact surfaces can be formed for example convexly and, in a manner compatible therewith, the other can be formed concavely.

A respective friction element can moreover be mounted on one or both contact surfaces. It is thus possible to improve or adapt the engagement behavior of the contact surfaces.

BRIEF DESCRIPTION OF THE DRAWINGS

The disclosure is now described in more detail with reference to the accompanying figures, which show.

DETAILED DESCRIPTION

Figure 1:
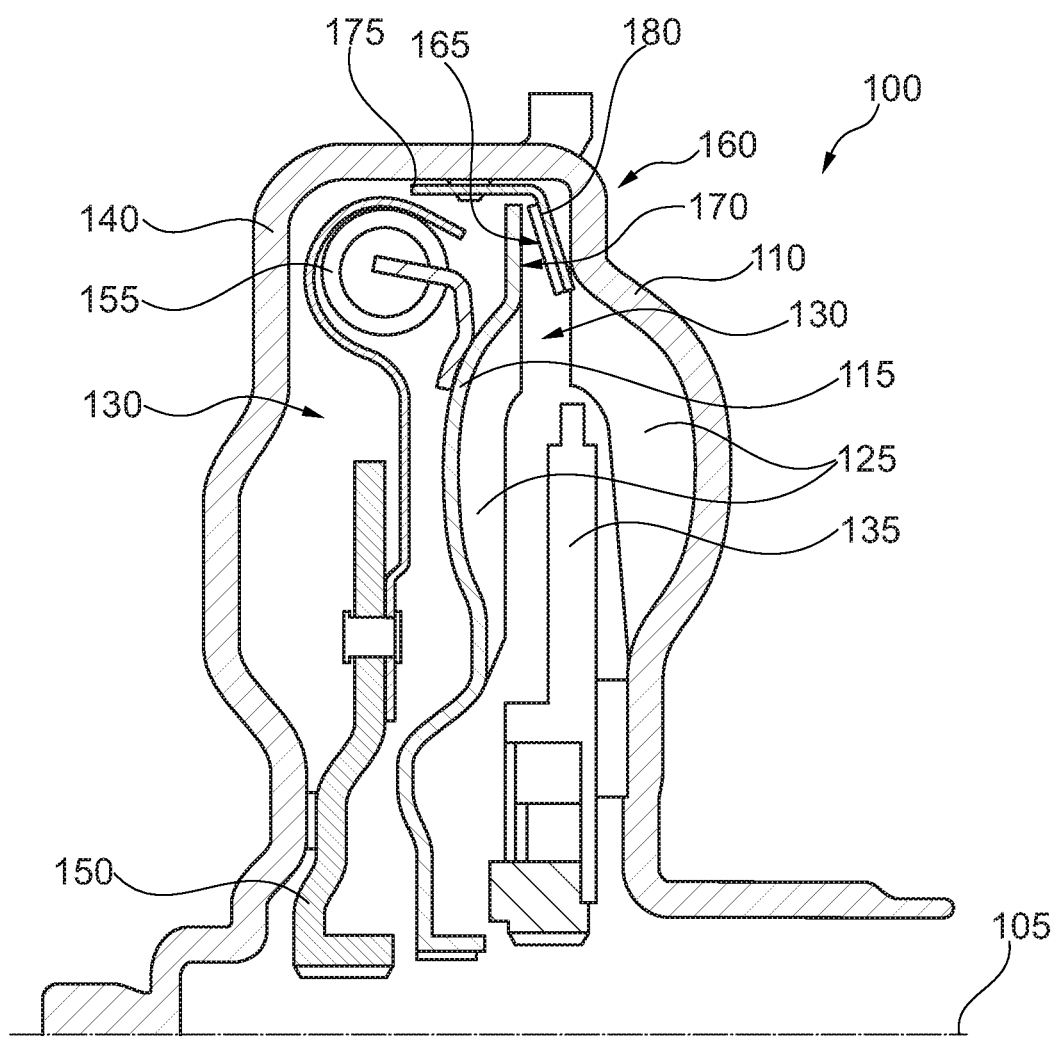
FIG. 1 a longitudinal section through a device for transmitting torque with a torque converter.

FIG. 1 shows a longitudinal section through a device 100 for transmitting torque. The device 100 is designed in particular for use in a drive train, for example of a motor vehicle. The device 100 can be in particular part of a converter, a dual clutch, a starting clutch or a power shift clutch.

The device 100 comprises an axis of rotation 105 about which a pump wheel 110 and a turbine wheel 115 of a hydrodynamic torque converter 120 are rotatably arranged. At a predetermined radial spacing from the axis of rotation 105, respective guide plates 125, which are axially opposite one another, are formed on the pump wheel 110 and the turbine wheel 115. Located in this region is a fluid 130, typically an oil, that couples the two wheels 110 and 115 hydrodynamically to one another. An optional guide wheel 135 is provided axially between the wheels 110, 115 for influencing the flow of the fluid 130.

The pump wheel 110 is preferably connected on its radial outer side to a housing 140 which receives the turbine wheel 115 and the fluid 130.

The pump wheel 110 and the housing 140 represent an input side 145 of the device 100 for transmitting torque. An output side 150 can be coupled to the turbine wheel 115 of the torque converter 120 directly or, as shown in FIG. 1, by means of an elastic element 155.

A lock-up clutch 160 is provided in a region which is preferably located radially outside the guide plates 125. To form the lock-up clutch 160, a first axial contact surface 165 is formed on the pump wheel 110 and a second axial contact surface 170 is formed on the turbine wheel 115. The contact surfaces 165, 170 are axially opposite one another and can be brought into frictional connection with one another in that the pump wheel 110 and the turbine wheel 115 are moved axially towards one another and pressed axially against one another.

In one embodiment, the turbine wheel 115 is designed to be axially movable relative to the pump wheel 110 and the housing 140. With respect to the fluid 130 in the housing 140, the turbine wheel 115 acts in the manner of a hydraulic piston, which is pressed axially in the direction of the pump wheel 110 when the hydraulic pressure on the side axially remote from the pump wheel 110 increases. If the housing 140 is rotating about the axis of rotation 105, the fluid 130 is pressed radially outwards and effects such hydraulic pressure. From a predetermined speed of the housing 140, the lock-up clutch 160 is therefore hydraulically closed so that the contact surfaces 165, 170 come into engagement with one another and reduce a slip between the pump wheel 110 and the turbine wheel 115, ideally to zero.

It is disclosed that one of the contact surfaces 165, 170 be mounted flexibly, in particular with respect to the axis of rotation 105, on the wheel 110, 115 associated therewith, so that the contact surfaces 165, 170 can lie closely against one another in an improved manner when the lock-up clutch 160 is closed. In the illustrated embodiment, the second contact surface 170 of the turbine wheel 115 is designed to be rigid or stiff with respect to the axis of rotation 105, whilst the first contact surface 165 is connected to the pump wheel 110 or the housing 140 by means of a flexible element 175. In another embodiment, as described more precisely below, the first contact surface 165 can also be rigidly mounted and the second contact surface 170 flexibly mounted. The flexible element 175 can also be omitted if the respective contact surface 165, 170 is flexibly formed on the wheel 110, 115 associated therewith. A friction element 180 can be optionally provided on one of the contact surfaces 165, 170.

The surface along which the contact surfaces 165 and 170 engage with one another when the two wheels 110, 115 are pressed axially against one another can be configured in various ways. The surface can be for example planar and enclose a predetermined angle with the axis of rotation 105. If this angle is 90°, the surface is located in the rotational plane. The contact surfaces 165, 170 can moreover also be concavely and convexly configured to correspond to one another. Other superimposed and expedient curvatures can also be used.

In an exemplary embodiment, the contact surfaces 165 and 170 are designed such that there is as little leakage as possible between the contact surfaces 165, 170, even when the lock-up clutch 160 is stationary or rotating at low speed. The closure of the lock-up clutch 160 is facilitated by the build-up of a hydraulic pressure of the fluid 130 under the influence of centrifugal force (centrifugal oil). If the lock-up clutch 160 is closed, the contact surfaces 165 and 170 can also lie against one another in a fluid-tight manner.

FIGS. 2 to 7 show variants of flexible contact surfaces 165, 170 on the torque converter 120 of FIG. 1. All the illustrations here are to be seen as schematic and as a possible embodiment in each case of the principle explained above with reference to FIG. 1. Each of the FIGS. 2 to 7 comprises an upper illustration, which is denoted by A and shows the opened lock-up clutch 160, and a lower illustration, which is denoted by B and shows the closed lock-up clutch 160. The variants shown in FIGS. 2 to 7 can be combined with one another and with the embodiment illustrated in FIG. 1. It is essentially possible in all embodiments for the design of the first contact surface 165 and the second contact surface 170 to be mutually interchangeable. Therefore, only one variant is described below; the inverse variant in each case will be readily obvious to a person skilled in the art.

Figure 2A:
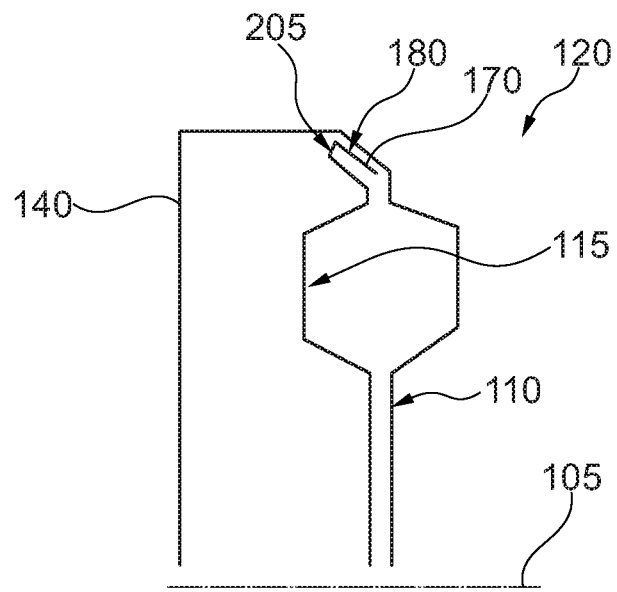
FIGS. 2-7 variants of flexible contact surfaces on the torque converter of FIG. 1.
Figure 2B:
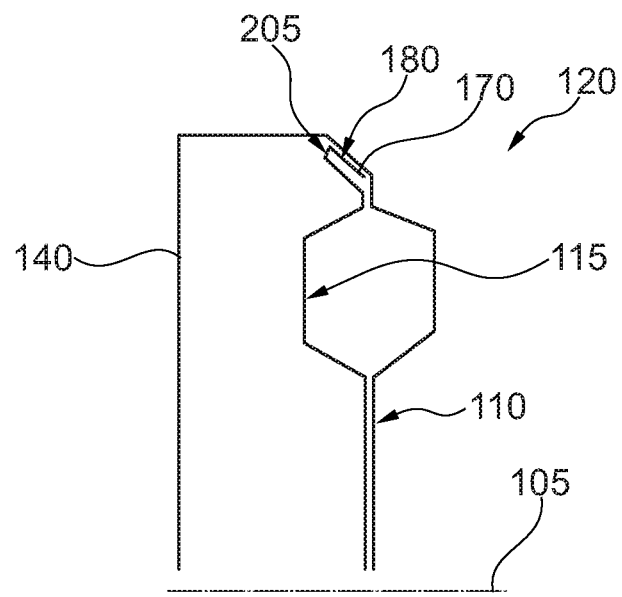

FIG. 2 shows an embodiment in which the second axial contact surface 170 is designed in one piece on a metal sheet, which is a component of the turbine wheel 115. The metal sheet is bent circumferentially about the axis of rotation 105, whereby a circumferential fold is formed 205. The fold angle between portions of the metal sheet on different sides of the fold 205 is preferably less that 180° when the metal sheet is unloaded (FIG. 2A). The metal sheet can be thinned out in the region of the fold 205 so that its material thickness is reduced. As a result of the geometry of the arrangement, the effective bending length of the metal sheet can be extended, thereby producing a further elastic effect of the metal sheet. The second contact surface 170 faces that portion of the metal sheet which is further away from the axis of rotation 105 along the metal sheet.

Figure 3A:
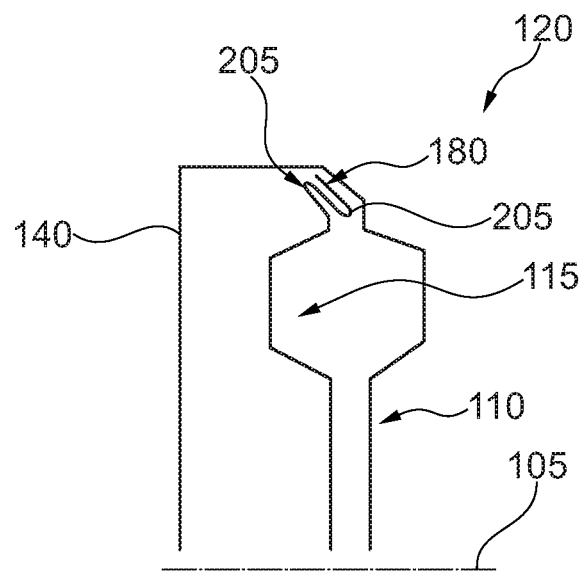
Figure 3B:
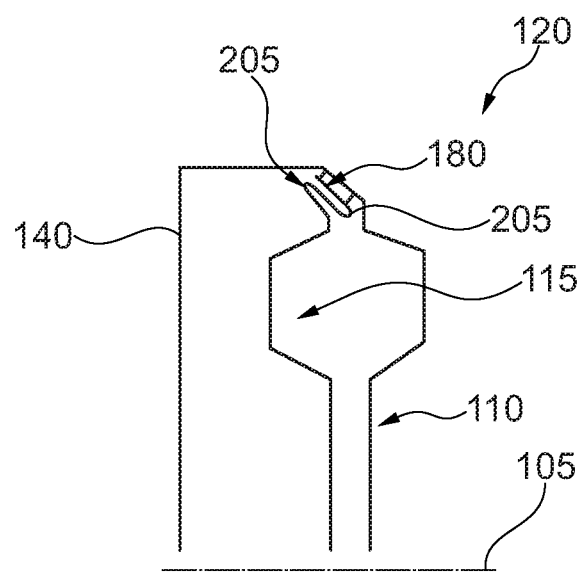

FIG. 3 shows an embodiment in which two folds 205 are provided about which the metal sheet of the turbine wheel 115 is folded. The bending directions are opposed to one another here to produce the Z-shaped fold illustrated. It is preferred for both folding angles to be smaller than 180°.

Figure 4A:
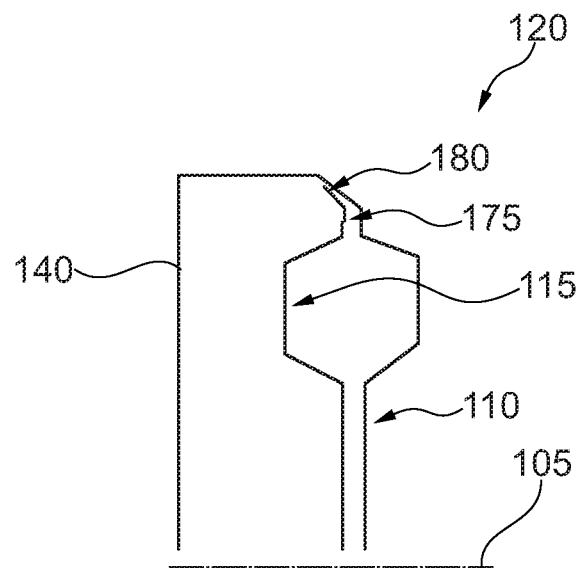
Figure 4B:
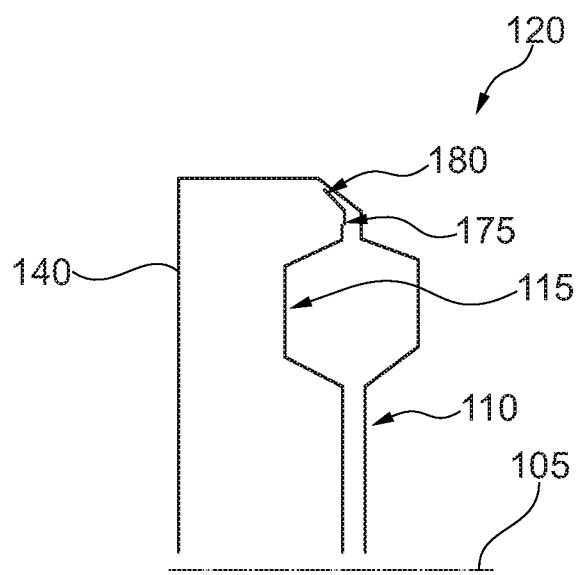

FIG. 4 shows an embodiment similar to that of FIG. 1, although the flexible element 175 is mounted on the turbine wheel 115. The flexible element 175 can comprise in particular a metal sheet.

Figure 5A:
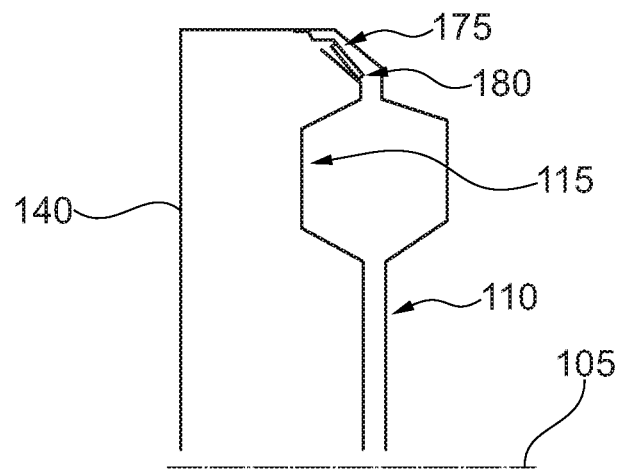
Figure 5B:
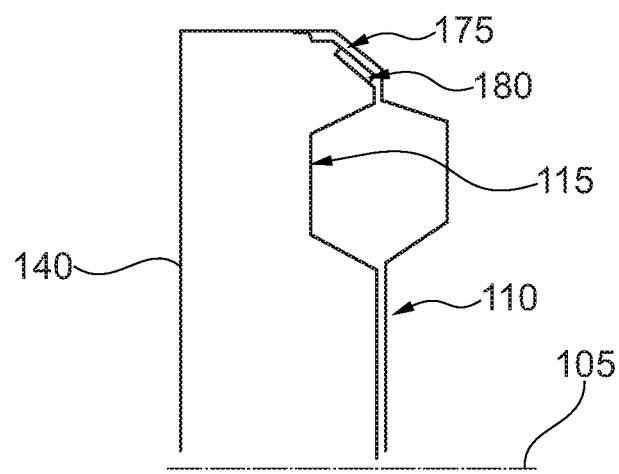

FIG. 5 shows a further embodiment according to that of FIG. 1.

Figure 6A:
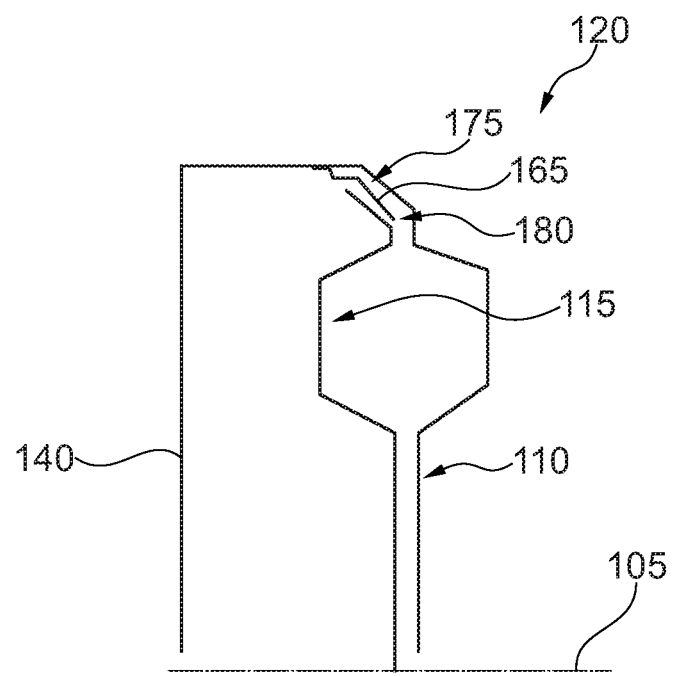
Figure 6B:
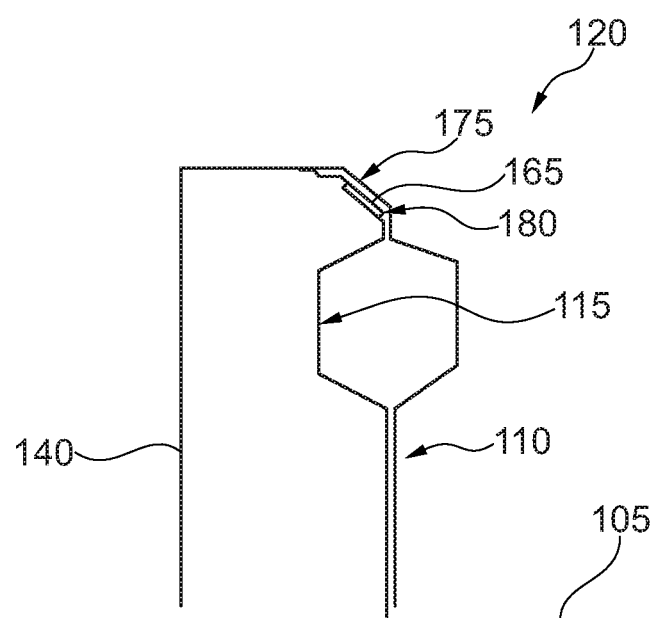

FIG. 6 shows a variant of the most recently shown embodiment, in which the flexible element 175 is mounted on the pump wheel 110 or the housing 140 and supports the first axial contact surface 165. The second contact surface 170 corresponding thereto is rigidly designed on the turbine wheel 115.

Figure 7A:
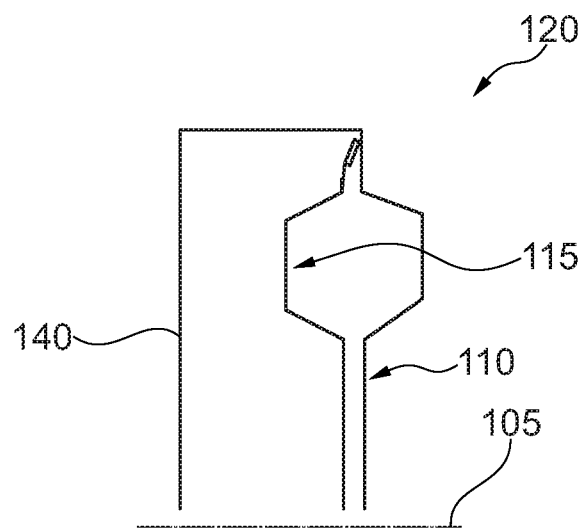
Figure 7B:
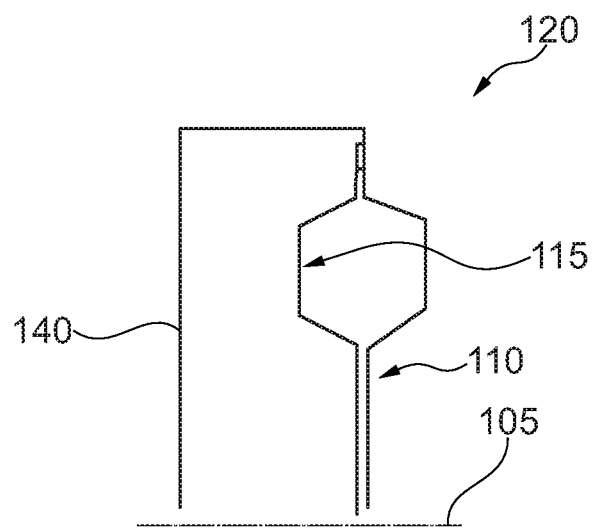

FIG. 7 shows yet another embodiment similar to that of FIG. 4, but with the mutually contacting contact surfaces 165, 170 (FIG. 7b) located in a rotational plane about the axis of rotation 105.

LIST OF REFERENCE NUMBERS

100 Device
105 Axis of rotation
110 Pump wheel
115 Turbine wheel
120 Torque converter
125 Guide plate
130 Fluid
135 Guide wheel
140 Housing
145 Input side
150 Output side
155 Elastic element
160 Lock-up clutch
165 First axial contact surface (on the pump wheel)
170 Second axial contact surface (on the turbine wheel)
175 Flexible element
180 Friction element
205 Fold

The invention claimed is:

1. A hydrodynamic torque converter, comprising:
a pump wheel and a turbine wheel mounted to be rotatable about an axis of rotation;
a fluid in a region between the pump wheel and the turbine wheel;
wherein a first axial contact surface is formed on the pump wheel and a second axial contact surface is formed on the turbine wheel;
wherein a frictional connection between the pump wheel and the turbine wheel can be produced when the pump wheel and the turbine wheel are pressed axially against one another;
wherein one of the contact surfaces is configured to be flexible in order to lie against the other contact surface under an axial pressure load;
wherein the contact surface configured to be flexible comprises a metal sheet that is folded over circumferentially; and
wherein the metal sheet is thinned out in a region of a bending edge of the metal sheet.

2. The torque converter as claimed in claim 1, wherein the turbine wheel is connected on a radially outer side to a housing in which the turbine wheel is received.

3. The torque converter as claimed in claim 1, wherein a fold angle of the metal sheet is less than 180° so that a fold of the metal sheet is open when the contact surface configured to be flexible is unloaded.

4. The torque converter as claimed in claim 1, wherein the metal sheet is folded over a plurality of times in alternate directions.

5. The torque converter as claimed in claim 1, wherein the contact surfaces enclose a predetermined angle with the axis of rotation.

6. The torque converter as claimed in claim 1, wherein a friction element is mounted on one of the contact surfaces.

7. The torque converter as claimed in claim 1, wherein the contact surface configured to be flexible comprises a separate element connected to the pump wheel or the turbine wheel.

8. The torque converter as claimed in claim 7, wherein the separate element is connected in a fluid-tight manner to the pump wheel or the turbine wheel.

9. A torque converter, comprising:
a pump including a first plurality of blades;
a turbine fluidly connected to the pump and including a second plurality of blades; and
a clutch disposed radially outside the first plurality of blades and the second plurality of blades, wherein the clutch includes a first contact surface mounted on the pump axially opposite a second contact surface mounted on the turbine, wherein the first contact surface or the second contact surface is flexibly mounted thereto, wherein the contact surfaces are configured to be frictionally engageable with one another, and wherein the contact surface flexibly mounted is folded over circumferentially and thinned out in a region of a blending edge of a fold of the contact surface.

10. The torque converter of claim 9, wherein the first contact surface or the second contact surface is flexibly mounted via a flexible element.

11. The torque converter of claim 9, wherein the first contact surface or the second contact surface includes a friction element attached thereto.

* * * * *